(12) United States Patent
Koseki

(10) Patent No.: US 9,124,744 B1
(45) Date of Patent: Sep. 1, 2015

(54) IMAGE READING APPARATUS AND IMAGE READING METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Naoya Koseki, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/327,689

(22) Filed: Jul. 10, 2014

(51) Int. Cl.
*H04N 1/04* (2006.01)
*H04N 1/00* (2006.01)
*H04N 1/10* (2006.01)

(52) U.S. Cl.
CPC ......... *H04N 1/00588* (2013.01); *H04N 1/1039* (2013.01); *H04N 1/1061* (2013.01); *H04N 2201/0081* (2013.01); *H04N 2201/04737* (2013.01)

(58) Field of Classification Search
CPC .......... H04N 2201/03125; H04N 2201/03141; H04N 2201/03145; H04N 2201/03112; H04N 5/2256; H04N 1/02835; H04N 2201/02456; H04N 2201/02479; G03H 1/0011; G03H 1/22; G03H 1/2286; G03H 2001/2223
USPC .................. 358/474, 497, 498, 486, 488, 448
See application file for complete search history.

(56) References Cited

U.S. PATENT DOCUMENTS

| | | | | |
|---|---|---|---|---|
| 6,564,028 | B2 * | 5/2003 | Kanno | 399/205 |
| 7,149,003 | B2 * | 12/2006 | Mui et al. | 358/474 |
| 7,468,818 | B2 * | 12/2008 | Suzuki | 358/498 |
| 7,948,663 | B2 * | 5/2011 | Doan et al. | 358/474 |
| 8,279,497 | B2 * | 10/2012 | Nakano et al. | 358/474 |
| 8,363,286 | B2 * | 1/2013 | Ikeno et al. | 358/474 |
| 2003/0202218 | A1 * | 10/2003 | Morinaga et al. | 358/474 |
| 2006/0028696 | A1 * | 2/2006 | Michiie et al. | 358/474 |
| 2007/0103741 | A1 * | 5/2007 | Suzuki | 358/498 |
| 2010/0142011 | A1 * | 6/2010 | Akahane | 358/498 |

FOREIGN PATENT DOCUMENTS

JP 2005-122208 5/2005

* cited by examiner

*Primary Examiner* — Negussie Worku
(74) *Attorney, Agent, or Firm* — Amin, Turocy & Watson, LLP

(57) ABSTRACT

An image reading apparatus comprises an automatic document feeding section automatically feeding a document to a specific automatic document reading position; an automatically fed document detection section detecting whether or not there is a document in the automatic document feeding section; a fixed document detection section detecting whether or not there is a fixed document placed on an original table glass; a drive section driving the carriage in the vertical scanning section; and a carriage movement control section moving the carriage in advance from the initial standby position of the carriage to a movement starting end position across the initial standby position facing an automatically fed document reading position where an automatically fed document is read or a fixed document reading starting position where the reading of a fixed document is started if the automatically fed document detection section or the fixed document detection section detects a document.

10 Claims, 3 Drawing Sheets

IMAGE READING APPARATUS AND IMAGE READING METHOD

FIELD

Embodiments described herein relate to a technology for controlling the position of a carriage according to a case of automatically feeding and reading a document and a case of reading a document in a state where the document is fixedly placed on an original table glass.

BACKGROUND

Conventionally, a carriage which is provided with, for example, two scanning optical sections is arranged in an image reading apparatus to read a document placed on an original table glass (hereinafter referred to as a fixed document). The first scanning optical section of the carriage illuminates the document through the original table glass with a document illuminating light source, and irradiates the reflecting mirror of the second scanning optical section with the reflection light from the document through a reflecting mirror. The second scanning optical section moves in a vertical scanning section at the speed of V and the first scanning optical section moves in the same direction at the speed of ½V. The reflection light from the document which entered the second scanning optical section is read by a CCD line sensor through another reflecting mirror.

On the other hand, in an image reading apparatus provided with an automatic document feeder (ADC), a carriage moves from a standby position to a reading position where the document is automatically fed.

The standby position of the carriage is selected such that a black shading processing and a white shading processing serving as an image reading standard in a shading correction are carried out at a stable position.

In this way, in the case where the standby position of the carriage is set to carry out black shading processing and white shading processing preferentially, the disadvantage is pointed out when the carriage is moved to a document reading position after a shading processing. For example, to determine the size of a fixed document and to read a document using a CCD line sensor, the carriage is moved from the standby position to a document reading position to detect the length of a sheet through shading processing according to whether or not there is reflection light of the sheet. Then, the carriage is returned to the original standby position after the shading processing is ended and then moved towards an image reading position along the vertical scanning direction until it reaches a given position to start to read an image.

Thus, in a case of reading an image of a fixed document, the carriage is first moved from the standby position to an image reading position to carry out shading processing and then returned to the original standby position after the shading processing. In a case where returns to the standby position, the carriage vibrates at the standby position because it stops suddenly. Then, the carriage is moved to read an image after the convergence time, i.e., the time required for convergence of the vibration of the carriage at the standby position elapses. Thus, the convergence time of the vibration along with the movement direction switching of the carriage needs to be guaranteed, which becomes a cause of the deterioration of image reading time.

DETAILED DESCRIPTION

In accordance with one embodiment, an image reading apparatus reads the image of a document using a carriage capable of moving in a vertical scanning section.

The image reading apparatus comprises an automatic document feeding section configured to automatically feed a document to a specific automatic document reading position; an automatically fed document detection section configured to detect whether or not there is a document in the automatic document feeding section; a fixed document detection section configured to detect whether or not there is a fixed document placed on an original table glass; a drive section configured to drive the carriage in the vertical scanning section; and a carriage movement control section configured to move the carriage in advance from the initial standby position of the carriage to a movement starting end position across the initial standby position facing an automatically fed document reading position where an automatically fed document is read or a fixed document reading starting position where the reading of a fixed document is started if the automatically fed document detection section or the fixed document detection section detects a document.

In accordance with one embodiment, an image reading method including: reading the image of a document using a carriage capable of moving in a vertical scanning section.

The image reading method including: automatically feeding a document to a specific automatic document reading position; detecting whether or not there is a document in an automatic document feeding section; detecting whether or not there is a fixed document placed on an original table glass; driving the carriage in the vertical scanning section; and moving, if the automatically fed document detection section or the fixed document detection section detects that there is a document, the carriage in advance from the initial standby position of the carriage to a movement starting end position across the initial standby position facing an automatically fed document reading position where an automatically fed document is read or a fixed document reading starting position where the reading of a fixed document is started.

Embodiments of the present invention are described below.

Figure 1:
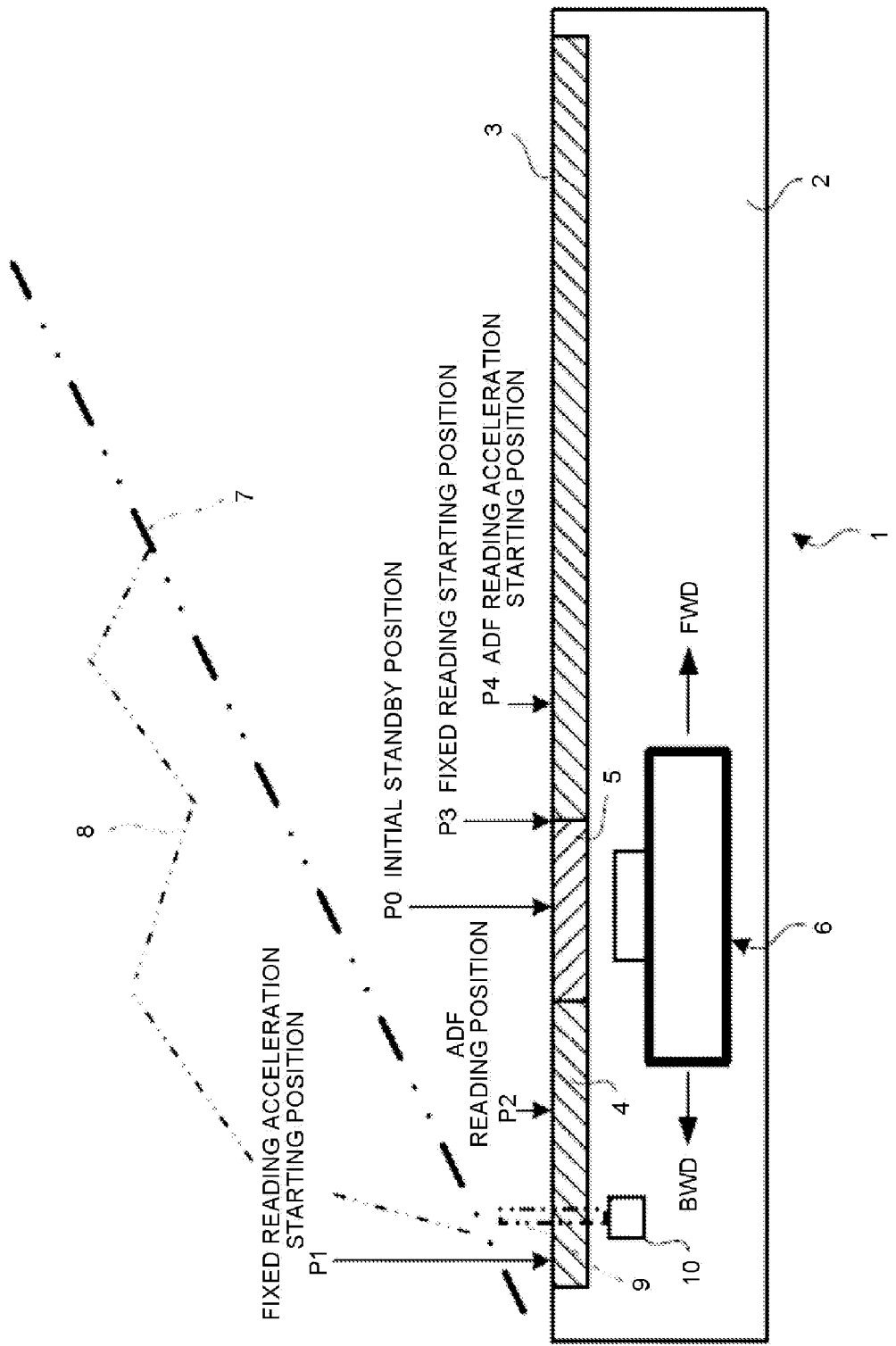
FIG. 1 is a schematic diagram illustrating an image reading apparatus according to an embodiment.

FIG. 1 is a schematic diagram illustrating an image reading apparatus according to an embodiment.

In FIG. 1, an image reading apparatus 1 mounted on a multi-functional peripheral (MFP) provided with a printer section starts to read an image when a copy button is pressed. In the image reading apparatus 1, an original table glass plate (hereinafter referred to as a platen glass) 3 and an ADF glass plate 4 for reading an automatically fed document (hereinafter referred to as an ADF document for short) are arranged on two sides of a vertical scanning section on the upper portion of an apparatus main body 2 across a white-surfaced lightproof shading processing plate 5 for performing shading processing which has a shielding property and the surface of which is white.

A carriage 6 for reading a document placed at a given position on the platen glass 3 (hereinafter referred to as a fixed document) and an ADF document passing the ADF glass plate 4 is arranged in the apparatus main body 2. In FIG. 1, the platen glass 3 is arranged at the right side of the shading processing plate 5 and the ADF glass plate 4 is arranged at the left side of the shading processing plate 5.

A document cover (hereinafter referred to as a platen cover) 7 provided with an automatic document feeder (ADF) 8 is openably and closably arranged on the apparatus main body 2. An ADF document detection sensor 26 (referring to FIG. 2) for detecting whether or not there is a document placed on a document tray is arranged on the ADF 8. The platen cover 7 presses a document on the platen glass 3 through a press plate (not shown) arranged on the lower surface thereof.

A platen cover opening/closing detection section 10 for detecting the opening/closing of the platen cover 7 is arranged in the apparatus main body 2. The platen cover opening/closing detection section 10 consisting of a photo interruptor detects an opening position and a closing position of the platen cover 7 according to whether or not the light path of the photo interruptor is blocked off by a detection lever section 9 vertically moving together with the opening/closing of the platen cover 7. The platen cover opening/closing detection section 10 outputs an ON signal when the platen cover is closed and an OFF signal when the platen cover is opened.

In the apparatus main body 2, the carriage 6 for reading a fixed document and an ADF document is arranged capable of moving in the vertical scanning section. As the movement direction of the carriage 6, the movement direction towards the right side of FIG. 1 is assumed as a forward direction (hereinafter referred to as FWD for short), and the movement direction towards the left side of FIG. 1 is assumed as a backward direction (hereinafter referred to as BWD for short). As an exemplary constitution of the carriage 6, a carriage 6 is exemplarily described which, for example, when reading an image, is provided with a first scanning optical section having an illuminating light source for illuminating a document and a reflecting mirror for reflecting the image light of the document and a second scanning optical section having a reflecting mirror for guiding the image light from the first scanning optical section towards an image capturing element such as a CCD line sensor, wherein the movement speed of the first scanning optical section is half that of the second scanning optical section. Further, an image reading section having the CCD line sensor is fixedly arranged on the apparatus main body 2. The image light from the reflecting mirror of the second scanning optical section which moves at a speed of V is imaged on the CCD, and the formed image is read. Further, although the carriage and the image reading section are independent from each other in the present embodiment, the CCD may be arranged on the carriage.

In the present embodiment, as to the positions of the carriage 6, the first scanning optical section may be located at an initial standby position P0, or a fixed reading acceleration starting position P1, or an ADF reading position P2 or a fixed reading starting position P3 and the second scanning optical section is located at an ADF reading acceleration starting position P4.

It is set that the initial standby position P0 is the position of the shading processing plate 5 and that the fixed reading starting position P1 is a position more away from the initial standby position P0 than the ADF reading position P2. It is set that the fixed reading starting position P3 is the boundary position of the platen glass 3 and the shading processing plate 5 and that the ADF reading acceleration starting position P4 is a position more away from the initial standby position P0 than the fixed reading starting position P3. The acceleration starting positions P1 and P4 from where the movement of the carriage towards the specific fixed reading starting position P3 and the ADF reading position P2 are set to lengthen an approach segment to converge the vibration of the carriage before the convergence time elapses even if the carriage is moved before the vibration caused by the movement direction switching of the carriage is converged. In this case, whether or not there is an ADF document or whether or not a fixed document is placed on the platen glass 3 is determined, the reading time of an image becomes longer when the carriage 6 is moved towards the acceleration starting positions P1 and P4 after an image reading starting signal is acquired by pressing a copy button.

Thus, in the present embodiment, if it is determined that there is an ADF document or a fixed document is placed on the platen glass 3, the carriage 6 is moved towards the acceleration starting positions P1 and P4 without waiting for an image reading starting signal acquired by pressing the copy button, and the carriage 6 is directly moved to the reading starting positions P2 and P3 if an image reading starting signal is acquired. In this way, the carriage 6 is moved to the reading starting positions P2 and P3 within a short time after the copy button is pressed. Further, as the carriage 6 is moved to the acceleration starting positions P1 and P4 in advance, the vibration of the carriage 6 is converged or mostly converged when the copy button is pressed, thereby achieving the stable reading of the document.

Figure 2:
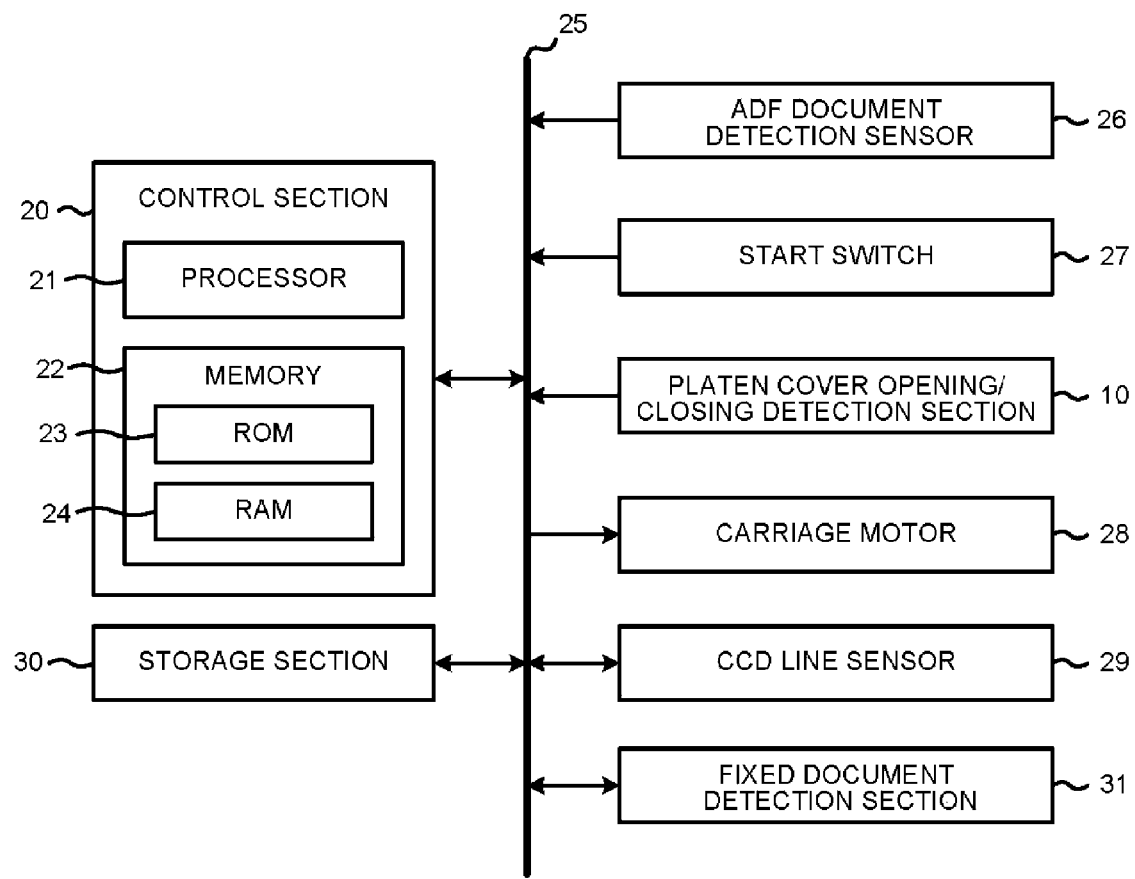
FIG. 2 is a block diagram illustrating the hardware constitution of the image reading apparatus shown in FIG. 1.

Next, the hardware constitution of the image reading apparatus is described with reference to FIG. 2.

The image reading apparatus 1 comprises a control section 20, the ADF document detection sensor 26, a start switch 27 which is turned on when the copy button of the MFP is pressed, the platen cover opening/closing detection section 10, a carriage motor 28 consisting of a pulse motor for moving the carriage 6, a COD line sensor 29, a storage section 30 and a fixed document detection section 31, which are connected with each other via a bus line 25.

The ADF document detection sensor 26 outputs an ON signal to the control section 20 if a document is placed on the ADF 8. Then, the control section 20 enables the carriage 6 to move from the initial standby position P0 to the ADF reading acceleration starting position P4 and waits for an ON signal of the start switch 27.

If the ADF document detection sensor 26 is in an ON state, the control section 20 enables the carriage 6 to move from the ADF reading acceleration starting position P4 to the ADF reading position P2 when acquiring the ON signal of the start switch 27. A movement position is positioned according to the drive pulse number of the carriage motor 28 serving as a pulse motor. Then, the reading of the image of an ADF document is started, and the read image is imaged on the CCD line sensor 29. Further, as the image reading apparatus 1 carried on the MFP is described in the present embodiment, the image read by the CCD line sensor 29 is recorded in the storage section 30 to be printed on a sheet by the printer section of the MFP.

The platen cover opening/closing detection section 10 detects, for example, the opened state or the closed state of the platen cover 7. In detecting the opened state of the platen cover 7, the carriage 6 stands by at the initial standby position P0. When the carriage 6 stands by at the initial standby position P0, the control section 20 acquires white reference data of a shading correction using the CCD line sensor 29 and records the acquired data in the storage section 30. When a fixed document is placed on the platen glass 3 and the platen cover opening/closing detection section 10 detects the closed state of the platen cover 7, the control section 20 estimates that the reading of the fixed document may be started and enables the carriage 6 to move towards the fixed reading acceleration starting position P1. Then, if the starting switch 27 is ON after the copy button is pressed, the carriage 6 is moved towards the FWD direction from the fixed reading acceleration starting position P1 to the fixed reading starting position P3 to carry out, for example, specific shading processing, and then a fixed document is read. The movement of the carriage 6 from the fixed reading acceleration starting position P1 to the fixed reading starting position P3 is realized by outputting drive pulses having a pulse number corresponding to the movement to the carriage motor 28. In addition, in other cases, the carriage 6 is moved according to the drive pulse number.

The fixed document detection section 31 consists of an image capturing element arranged in the apparatus main body 2. When the platen cover 7 is opened, external light enters the fixed document detection section 31 almost uniformly through the entire surface of the platen glass 3 if no fixed document is placed on the platen glass 3. However, if a document is placed on the platen glass 3, then external light will not enter the fixed document detection section 31 from where the document is placed. Thus, the fixed document detection section 31 detects whether or not there is a fixed document by detecting whether or not external light is blocked off. Further, the fixed document detection section is not limited to this constitution.

The control section 20 which comprises a processor 21 consisting of a CPU (Central Processing Unit) or a MPU (Micro Processing Unit) and a memory 22 controls the movement of the carriage 6.

The memory 22, which is, for example, a semiconductor memory, includes a ROM (Read Only Memory) 23 for storing various control programs, the initial standby position P0, the fixed reading acceleration starting position P1, the ADF reading position P2, the fixed reading starting position P3 and the ADF reading acceleration starting position P4 and a RAM (Random Access Memory) 24 for providing a temporary work area for the control on the position of the carriage 6.

The position control of the carriage 6 by the control section 20 is described with reference to the flowchart shown in FIG. 3. Further, the carriage is referred to as CRG for short in FIG. 3.

First, whether or not there is a document placed on the ADF 8 is determined by the ADF document detection sensor 26 in ACT 1. The flow proceeds to ACT 2 if the ADF document detection sensor 26 detects that there is a document placed on the ADF 8 and then output an ON signal, or the flow proceeds to ACT 7 if an OFF signal is output.

In ACT 2, the CRG 6 is moved from the initial standby position P0 to the ADF reading acceleration starting position P4 towards the FWD direction, and then the flow proceeds to ACT 3.

In ACT 3, if a copy button is pressed and the start signal of the start switch 27 is acquired by the control section 20, the reading of the ADF document is started (ACT 6) and the reading operation is ended after all ADF documents are read. Further, the image of the read ADF document is printed on a recording medium such as a sheet by the printer section, and then the copying is ended. Further, if the control section 20 acquires no start signal in ACT 3, the flow proceeds to ACT 4 to determine whether or not the ADF document detection sensor 26 is switched from an ON state to an OFF state, if the ADF document detection sensor 26 is kept in an ON state, the flow returns to ACT 3 to wait for the output of a start signal. Further, the flow proceeds to ACT 5 if the ADF document detection sensor 26 is switched from an ON state to an OFF state when the document is taken away from the ADF 8.

In ACT 5, the CRG 6 is moved from the ADF reading acceleration starting position P4 to the initial standby position P0 towards the BWD direction, and then the flow proceeds to ACT 1.

That is, in ACT 1-ACT 6, whether or not there is an ADF document on the document tray of the ADF 8 is confirmed, if there is an ADF document, as it is preferred to read the ADF document, thus, an ADF reading mode is determined in the image reading apparatus 1, and the carriage 6 is moved to the ADF reading acceleration starting position P4. In a case where the copy button is pressed, a reading operation is executed to end the copying process. In this case, as the carriage 6 is moved to the ADF reading acceleration starting position P4 in advance, and consequentially, the carriage 6 is only moved towards the BWD direction when receiving a copy starting instruction. At this time, whether or not to perform an ADF reading operation cannot be determined when an ADF document is taken away from the document tray of the ADF 8 without pressing the copy button, thus, the carriage 6 is moved to the initial standby position P0 to be in the initial state (standby).

On the other hand, if the ADF document detection sensor 26 detects that no ADF document is placed on the document tray of the ADF 8 and outputs an OFF signal in ACT 1, whether or not there is a fixed document is determined in ACT 7.

Whether or not a fixed document is placed on the platen glass 3 is determined in ACT 7 by the fixed document detection section 31 arranged in the apparatus main body 2, and the flow proceeds to ACT 8 if the fixed document detection section 31 determines that no fixed document is placed on the platen glass 3 or ACT 9 if the fixed document detection section 31 determines that there is a fixed document placed on the platen glass 3.

In ACT 8, the carriage 6 stands by at the initial standby position P0 and the flow returns to ACT 7 and waits for a detection on a fixed document.

If a fixed document is detected, the CRG 6 is moved from the initial standby position P0 to the fixed reading acceleration starting position P1 towards the BWD direction in ACT 9, and then the flow proceeds to ACT 10.

In ACT 10, if the copy button is pressed and the control section 20 acquires the start signal of the start switch 27, in order to start to read the fixed document, the carriage 6 is moved towards the FWD direction, and the fixed document is read (ACT 11), and then the reading is ended. Further, the image of the read fixed document is printed on a recording medium such as a sheet by the printer section, thereby ending the copying process. Further, the flow proceeds to ACT 12 if the control section 20 acquires no start signal in ACT 10.

Whether or not the platen cover 7 is opened is determined in ACT 12. The opening/closing of the platen cover 7 is determined according to a detection signal from the platen cover opening/closing detection section 10, and it is determined that the platen cover 7 is closed if an ON signal is detected, and then the flow returns to ACT 10 and waits for a start signal. Further, it is determined that the platen cover 7 is opened if the detection signal of the platen cover opening/closing detection section 10 is OFF, and then the flow returns to ACT 7 to detect whether or not there is a fixed document again.

That is, in ACT 7-ACT 11, whether or not there is an ADF document on the document tray of the ADF 8 is confirmed, and whether or not there is a fixed document is detected if there is no ADF document on the document tray of the ADF 8.

A fixed document reading mode is determined when a fixed document is detected, then the carriage 6 is moved to the fixed document reading acceleration position P1. The fixed document is read and the copying process is ended when the copy button is pressed in this state. Herein, as the carriage 6 is moved to the fixed document reading acceleration starting position P1 in advance, the carriage 6 is only moved towards the FWD direction. At this time, when the platen cover 7 is open without pressing the copy button and no fixed document is detected, as there is no document on the document tray of the ADF 8 and no fixed document is placed on the platen glass 3, thus, the carriage 6 is moved to the initial standby position P0 to be in the initial state (standby).

Further, in the description above, the start switch is turned on by pressing a copy button arranged on the scanning section of the MFP to realize the flow starting from the reading of a document to the printing of the document, however, in the case of an individual image reading apparatus, a start button indicating the starting of a reading operation is pressed to switch on the start switch to read an image, and then the read image data is stored in the storage section 30.

According to the present embodiment, the image reading apparatus determines a user-desired reading mode by confirming whether or not there is an ADF document on the document tray of the ADF 8 or there is a fixed document placed on the platen glass 3. Then, the carriage 6 is moved to an optimal position (fixed reading acceleration starting position P1 or ADF reading acceleration starting position P4) according to the reading mode before a copy button is pressed to start a copying operation (reading operation). In this case, even moved from the initial standby position P0 to the fixed reading acceleration starting position P1, the carriage 6 is not immediately moved towards a direction opposite to the movement direction. Further, an ADF document is not read immediately even if the carriage 6 stops at the ADF reading acceleration starting position P4. Thus, the vibration is converged during the period from the moment the copy button is pressed to the moment a reading operation is started. Then, in a state where the vibration generated in the carriage 6 is converged, the carriage 6 is moved to the fixed reading starting position P3 and because the image of the document at the ADF reading position P2 is read, thereby achieving the stable reading of an image.

Figure 3:
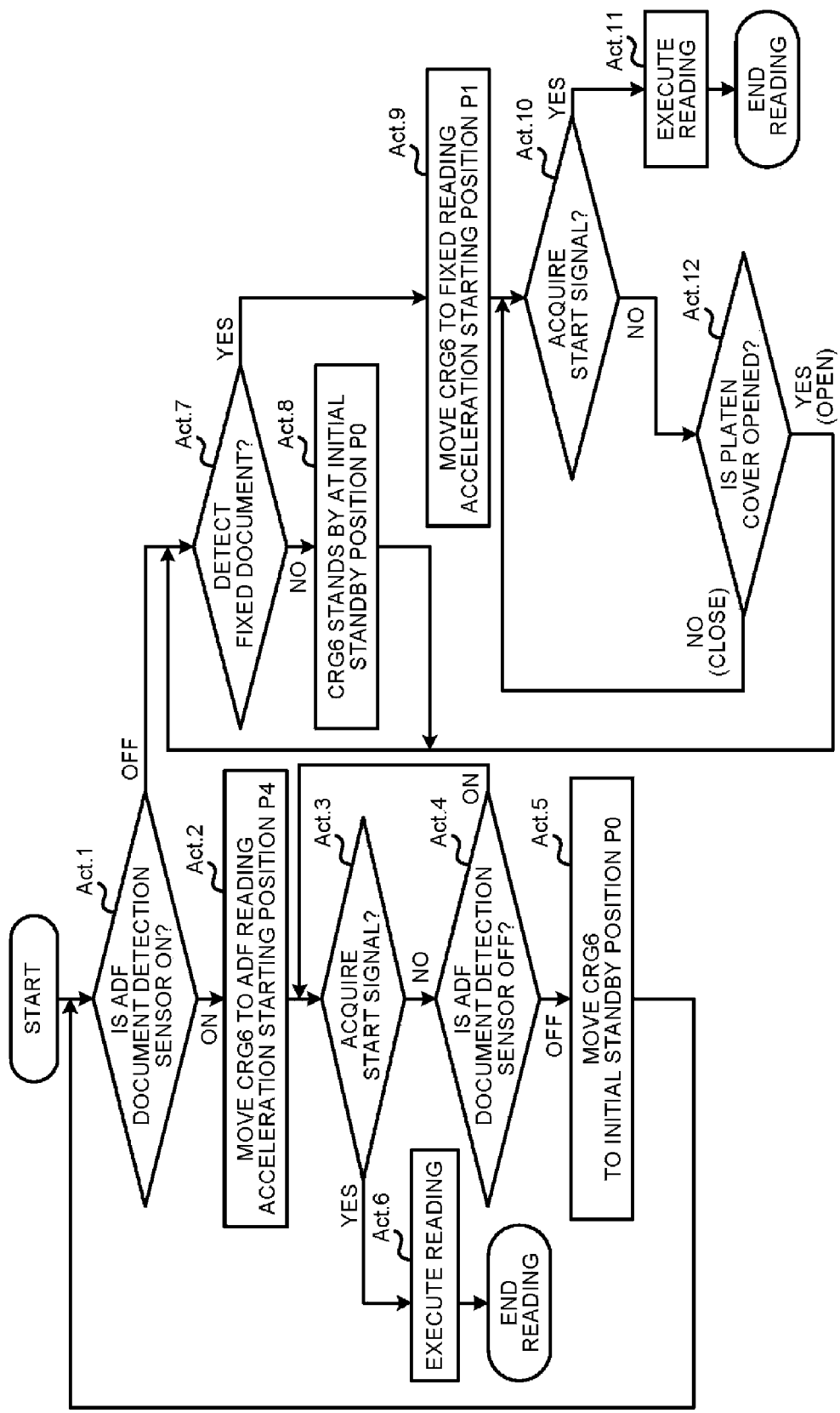
FIG. 3 is a flowchart illustrating a carriage position control processing carried out by the hardware constitution of the image reading apparatus shown in FIG. 2.

It is exemplified that the processing described as shown in FIG. 3 is carried out by executing a program pre-stored in the storage area arranged in an image forming apparatus (image reading apparatus) by an internal data processor, however, the program can be downloaded to the image forming apparatus (image reading apparatus) from a network or stored in a computer-readable recording medium and then installed in the image forming apparatus (image reading apparatus). The recording medium may be any computer-readable recording medium that is capable of storing a program. The recording medium may be, for example, a RAM (Random Access Memory), a ROM (Read Only Memory), a DRAM, a SRAM (Static Random Access Memory), a VRAM (Video RAM) or a flash memory.

The embodiments described herein may be embodied in a variety of other forms without departing from the spirit and scope of the present invention. Therefore, the embodiments described herein are merely illustrative in all respects, and should not be interpreted restrictively. The scope of the present invention is defined by the scope of the accompanying claims, and by which the text of description is not bound. All modifications, various improvements, substitutions and changes belonging to the equivalent scope of the claims are within the scope of the present invention.

What is claimed is:

1. An image reading apparatus for reading the image of a document using a carriage capable of moving in a vertical scanning section, comprising:
    an automatic document feeding section configured to automatically feed the document to a specific automatic document reading position;
    an automatically fed document detection section configured to detect whether or not there is a document in the automatic document feeding section;
    a fixed document detection section configured to detect whether or not there is a fixed document placed on an original table glass;
    a drive section configured to drive the carriage in the vertical scanning section; and
    a carriage movement control section configured to move the carriage in advance from an initial standby position of the carriage to a movement starting end position if the automatically fed document detection section or the fixed document detection section detects a document; wherein
    the initial standby position is positioned between the movement starting end position and an automatically fed document reading position in the vertical scanning section, and positioned between the movement starting end position and a fixed document reading starting position in the vertical scanning section;
    the automatically fed document reading position is the position where an automatically fed document is read; and
    the fixed document reading starting position is the position where the reading of a fixed document is started.

2. The image reading apparatus according to claim 1, further comprising:
    a start switch configured to indicate the execution of a reading operation; and
    if the start switch is ON indicating the execution of a reading operation, the carriage movement control section moves the carriage from the movement starting end position to the automatically fed document reading position or a fixed document reading starting position.

3. The image reading apparatus according to claim 1, wherein
    if the automatically fed document detection section detects a document, the carriage movement control section moves the carriage from the initial standby position to the movement starting end position arranged at the side thereof in a forward scanning direction.

4. The image reading apparatus according to claim 1, wherein
    when the fixed document detection section detects a document, the carriage movement control section moves the carriage from the initial standby position to the movement starting end position arranged at the side thereof in a backward scanning direction.

5. The image reading apparatus according to claim 1, further comprising:
    a document cover covering the original table glass;
    an opening/closing detection section configured to detect the closing/opening of the document cover; and
    a start switch configured to indicate the execution of a reading operation; wherein
    the carriage movement control section moves the carriage from the movement starting end position to the fixed document reading starting position based on a reading operation indication from the start switch during the process the opening/closing detection section detects the closed state of the document cover after the carriage movement control section moves the carriage to the movement starting end position corresponding to the fixed document reading starting position when the fixed document detection section detects a fixed document.

6. The image reading apparatus according to claim 1, further comprising:
   a document cover covering the original table glass;
   an opening/closing detection section configured to detect the closing/opening of the document cover; and
   a start switch configured to indicate the execution of a reading operation; wherein
   the carriage movement control section waits for next detection result of the fixed document detection section if the opening of the document cover is detected by the opening/closing detection section while no reading operation indication is given from the start switch after the carriage movement control section moves the carriage to the movement starting end position corresponding to the fixed document reading starting position when the fixed document detection section detects a fixed document.

7. The image reading apparatus according to claim 1, wherein
   the drive section is provided with a carriage motor consisting of a pulse motor as a drive source, and the position of the carriage is controlled according to a drive pulse number.

8. The image reading apparatus according to claim 1, wherein
   a component for a shading processing is arranged at the initial standby position.

9. The image reading apparatus according to claim 1, wherein
   a fixed document reading starting position and a movement starting end position for an automatically fed document are sequentially positioned from the initial standby position at the forward side of a vertical scanning section along which the carriage is moved, and an automatically fed document reading position and a movement starting end position for a fixed document are sequentially positioned from the initial standby position at the backward side of the vertical scanning section along which the carriage is moved.

10. An image reading method of reading the image of a document using a carriage capable of moving in a vertical scanning section, including:
    feeding the document automatically to a specific automatic document reading position;
    detecting whether or not there is a document in the automatic document feeding section;
    detecting whether or not there is a fixed document placed on an original table glass;
    driving the carriage in the vertical scanning section; and
    moving the carriage in advance from an initial standby position of the carriage to a movement starting end position if an automatically fed document detection section or a fixed document detection section detects a document; wherein
    the initial standby position is positioned between the movement starting end position and an automatically fed document reading position in the vertical scanning section, and positioned between the movement starting end position and a fixed document reading starting position in the vertical scanning section;
    the automatically fed document reading position is the position where an automatically fed document is read; and
    the fixed document reading starting position is the position where the reading of a fixed document is started.

\* \* \* \* \*